UNITED STATES PATENT OFFICE.

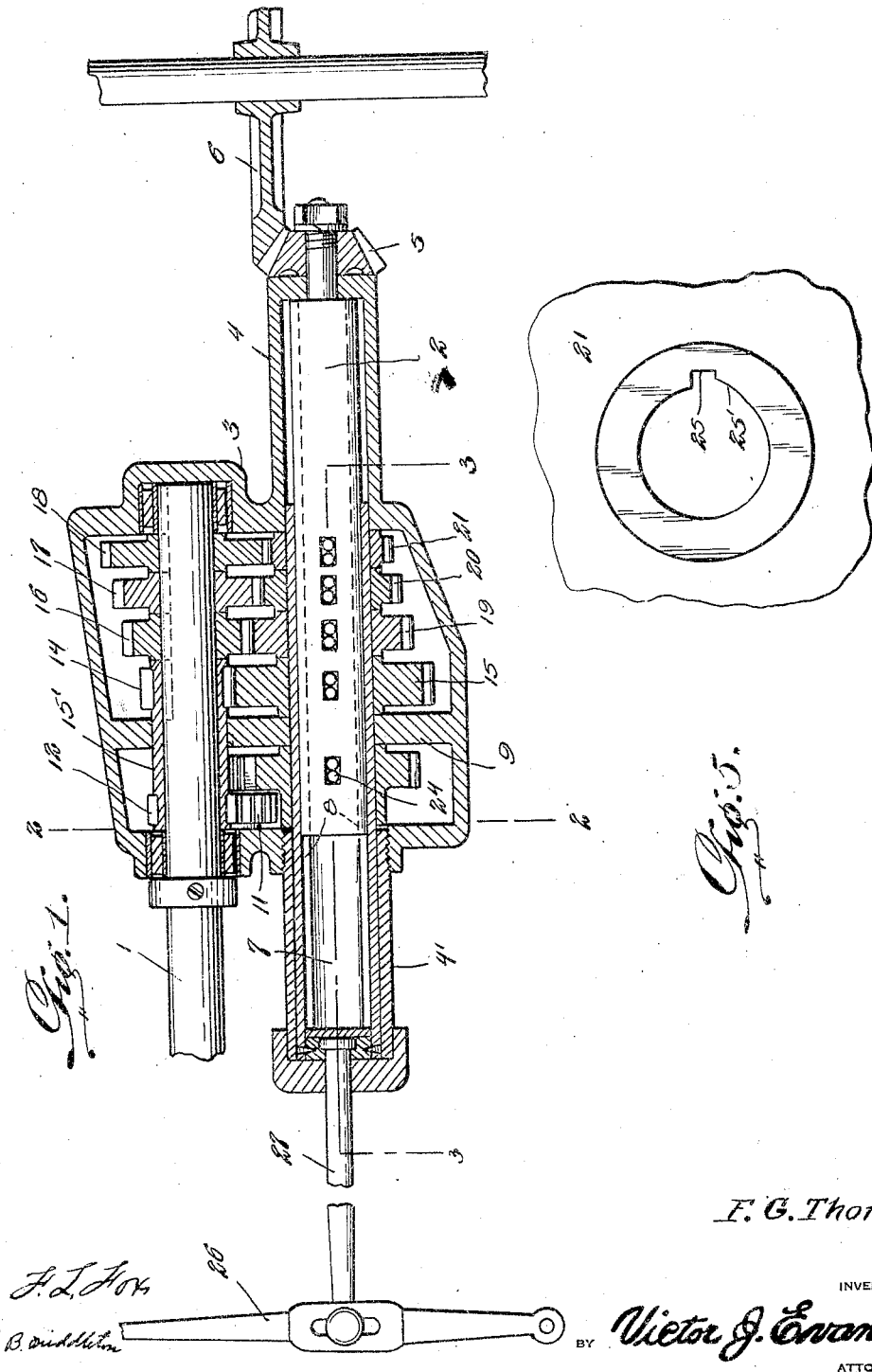

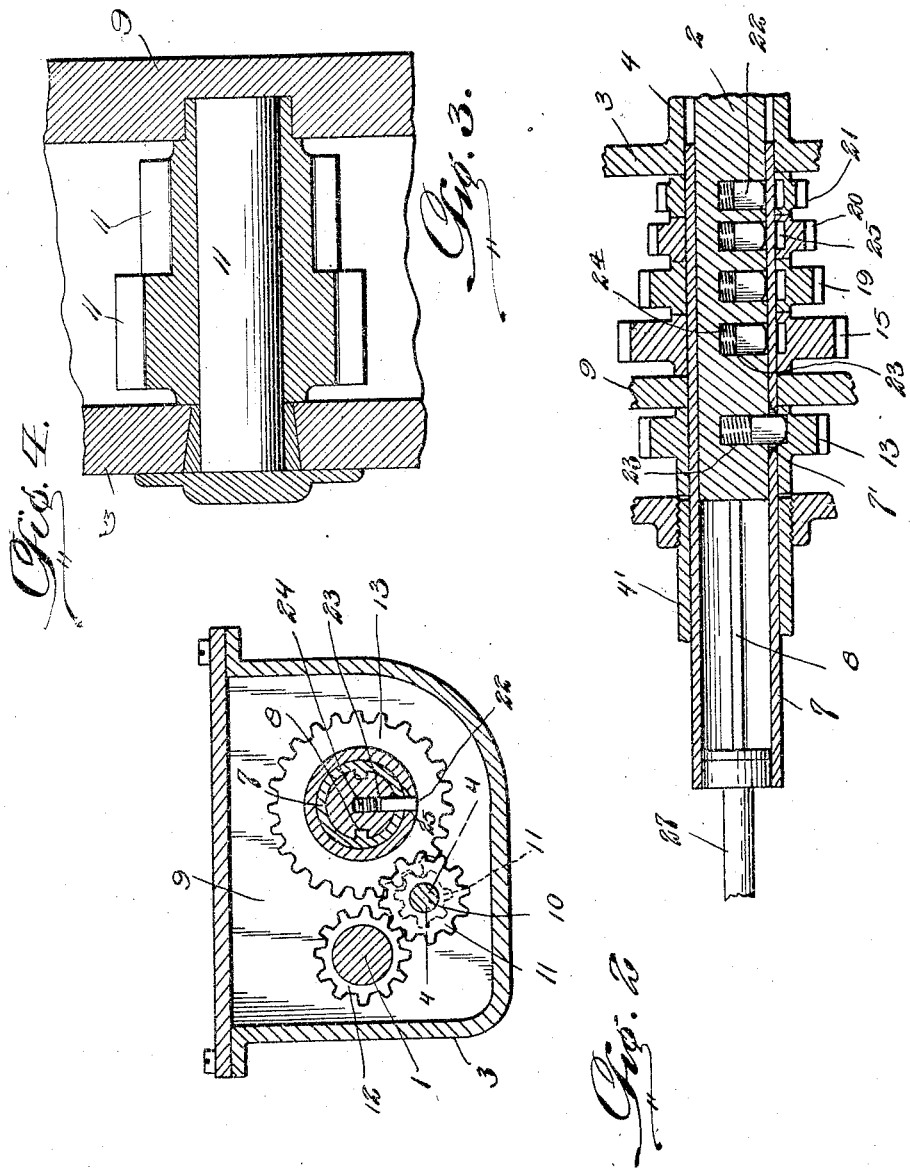

FRANK G. THOMAS, OF ASTORIA, OREGON.

TRANSMISSION-GEARING.

1,382,572.    Specification of Letters Patent.    Patented June 21, 1921.

Application filed April 5, 1920. Serial No. 371,234.

*To all whom it may concern:*

Be it known that I, FRANK G. THOMAS, a subject to the King of Greece, residing at Astoria, in the county of Clatsop and State of Oregon, have invented new and useful Improvements in Transmission-Gearing, of which the following is a specification.

This invention relates to transmission gearing for automobiles and the like and one of the objects of the invention is to provide means whereby the transmission lever is rocked back and forth in a straight horizontal line to move the parts for reverse and high and low speeds.

Another object of the invention is to so arrange the parts that the gears on the drive shaft and on the driven shaft are always in mesh and to provide means for locking the desired gear on the driven shaft to the said shaft by the movement of the hand lever.

Still another object of the invention is to provide a plurality of spring controlled keys for locking the gears to the driven shaft and a slidable member, actuated by the hand lever, for controlling said keys.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a longitudinal sectional view of the invention.

Fig. 2 is a section on line 2—2 of Fig. 1.

Fig. 3 is a longitudinal sectional view on line 3—3 of Fig. 1.

Fig. 4 is a sectional view of the reversing gears.

Fig. 5 is a detail view.

In these views 1 indicates the drive shaft which is driven from the engine and 2 indicates the driven shaft, portions of these shafts being journaled in the gear casing 3. The casing is provided with a tubular extension 4 which surrounds the rear part of the driven shaft 2 and the end of said driven shaft is reduced and receives a beveled gear 5 which is adapted to mesh with the gear 6 connected with the differential. The front part of the casing 3 is also provided with an extension 4' which is in alinement with the extension 4 and these extensions form guideways for a slidable sleeve 7 which surrounds the shaft 2 and passes through the housing or casing 3. This sleeve is keyed on the shaft 2, as shown at 8, so that it is held against rotation. The casing 3 is provided with a partition 9 through which the shafts and sleeve pass and this partition and the end wall of the casing support bearings for the shaft 10 which carries a double reversing gear 11. Another reversing gear 12 is keyed to the shaft 1 and this gear 12 meshes with the gear 11 and this gear 11 meshes with a large reversing gear 13 rotatably mounted on the sleeve 7. A low speed gear 14 is located on the other side of the partition 9 and this gear is connected with the gear 12 by the sleeve 15', the two gears and the sleeve being formed integral with each other. This gear 14 meshes with the large low speed gear 15 which is rotatably mounted on the sleeve 7. I also key to the shaft 1 the two intermediate speed gears 16 and 17 and the high speed gear 18. These three gears mesh with the gears 19, 20 and 21, rotatably mounted on the shaft 2. It will thus be seen that all the gears are in constant mesh with each other and that the gears on the driven shaft 2 will act as idle gears until locked to said shaft.

The means for locking the desired gear to said shaft 2 comprises a number of keys or sliding plates 22, one for each of the gears carried by the driven shaft. These keys are located in slots 23 formed in the shaft 2 and the keys are pressed outwardly by the springs 24 in the said slots. Each of the freely mounted gears is provided with a notch 25 in its inner circumference to receive its key, said notch having one of its walls tapered off as at 25' for facilitating the entrance of the key into the slot. The sleeve 7 is provided with a slot 7' having its end wall under cut to engage the inclined walls formed on the outer end of the keys. This slot is so arranged that as the sleeve is moved longitudinally on the shaft 2 it will uncover the keys one at a time so as to permit the springs to force the key through the slot and into engagement with the notch in the gear when said notch is brought around opposite the key. All the other keys will be held in their openings by the sleeve so that but one of the gears will be attached to the shaft at a time. When the sleeve is moved to place the slot 7' opposite the partition 9 all of the keys will be held in their holes and thus the parts will be in neutral position and the driven shaft 2 will not be rotated.

The sleeve is reciprocated by means of the hand lever 26 which is arranged to be operated by the operator of the automobile, and is connected to said sleeve by the rod 27.

When it is desired to reverse the automobile the hand lever 26 is moved away from the driver so as to bring the slot in the sleeve opposite the first key to permit said key to engage with the reverse gear 13. When the automobile is to be driven in a forward direction the hand lever is moved toward the driver so as to cause the lever to push the reverse key in and then the slot in said sleeve will pass to its neutral position and will then come opposite the second key and permit the second key to engage the gear 15, which is the low speed gear. When the clutch is thrown in the automobile will move along at low speed. Then the hand lever is moved again so as to cause the sleeve to push in the second key and permit the third key to engage the first intermediate speed gear. After the automobile picks up speed on this gear the sleeve is moved again to bring its slot opposite the key of the second intermediate gear and finally the sleeve is moved to bring its slot opposite the key of the high speed gear. As will be seen the movement of the hand lever is in a straight line and its various positions will be suitably marked on the floor or other part of the automobile so that the driver can tell the exact positions of the lever.

While I have shown the driven shaft as geared to the differential by cog wheels it will of course be understood that the shaft may be connected with the differential in any suitable way.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

Transmission means of the class described comprising a casing having a partition therein, a drive shaft extending into said casing, gears keyed to said part of the shaft within the casing, a sleeve mounted on said shaft and extending through the partition, a gear formed at each end of said sleeve, a stub shaft mounted in the casing, reversing gears carried thereby, one of which engages one of the gears on the sleeve, a driven shaft in the casing, extensions on the casing inclosing the ends of said driven shaft, a sleeve having sliding movement on the driven shaft and located within the casing and its extensions, said sleeve having a slot therein having beveled ends and the driven shaft having recesses therein, spring pressed keys in said recesses and adapted to project from the slot in the sleeve when said sleeve is moved to bring the slot into register with said key, gears rotatably mounted on the sleeve and meshing with the gears on the drive shaft and with one of the reversing gears and a hand lever for moving the sleeve on the driven shaft.

In testimony whereof I affix my signature.

FRANK G. THOMAS.